United States Patent
Dhandayuthapani et al.

(10) Patent No.: US 10,862,993 B2
(45) Date of Patent: Dec. 8, 2020

(54) SINGLE SOLUTION FOR USER ASSET CONTROL

(71) Applicant: McAfee, LLC, Santa Clara, CA (US)

(72) Inventors: Sumithra Dhandayuthapani, Chennai (IN); Sumithira Rasappa Gounder, Bangalore (IN); Rohit Jain, Bangalore (IN); Simon Hunt, Naples, FL (US)

(73) Assignee: MCAFEE, LLC, San Jose, CA (US)

( * ) Notice: Subject to any disclaimer, the term of this patent is extended or adjusted under 35 U.S.C. 154(b) by 0 days.

(21) Appl. No.: 16/405,751

(22) Filed: May 7, 2019

(65) Prior Publication Data

US 2019/0268436 A1 Aug. 29, 2019

Related U.S. Application Data

(63) Continuation of application No. 14/750,782, filed on Jun. 25, 2015, now Pat. No. 10,326,856.

(51) Int. Cl.
*H04L 29/08* (2006.01)
*H04L 29/06* (2006.01)
*H04W 12/12* (2009.01)

(52) U.S. Cl.
CPC ........ *H04L 67/2852* (2013.01); *H04L 63/083* (2013.01); *H04L 63/1466* (2013.01); *H04W 12/1206* (2019.01)

(58) Field of Classification Search
None
See application file for complete search history.

(56) References Cited

U.S. PATENT DOCUMENTS 7,155,729 B1 * 12/2006 Andrew .............. G06F 9/44505
                                                           719/318
9,473,505 B1 * 10/2016 Asano .................. H04L 63/102
(Continued)

FOREIGN PATENT DOCUMENTS

CN    101755263    6/2010
WO    2004015576    2/2004

OTHER PUBLICATIONS

International Bureau, "International Preliminary Report on Patentability," issued in connection with application No. PCT/US2016/034139, dated Jan. 4, 2018, 10 pages.
(Continued)

*Primary Examiner* — William J. Goodchild
(74) *Attorney, Agent, or Firm* — Hanley, Flight & Zimmerman, LLC

(57) ABSTRACT

Methods, apparatus, systems and articles of manufacture are disclosed to manage digital assets owned by a user and hosted by a first online service provider and a second online service provider. Provided herein is a gateway system comprising: a trusted authentication interface; one or more processors; and memory including instructions that, when executed, cause the one or more processors to at least: authenticate the user with the first and second online service providers using the trusted authentication interface; and instruct, via the trusted authentication interface, the first and second online service provider to take an action with respect to one or more of the digital assets, the first and second online service providers to trust the instructions from the trusted authentication interface without further authenticating the user.

23 Claims, 8 Drawing Sheets

(56) References Cited

U.S. PATENT DOCUMENTS

| | | | |
|---|---|---|---|
| 10,326,856 B2 | 6/2019 | Dhandayuthapani et al. | |
| 2003/0217001 A1* | 11/2003 | McQuaide, Jr. | G06Q 20/10 705/41 |
| 2004/0249961 A1* | 12/2004 | Katsube | H04L 63/0884 709/229 |
| 2008/0033871 A1* | 2/2008 | Birbara | G06Q 40/08 705/39 |
| 2009/0055877 A1* | 2/2009 | Rhim | H04N 21/2665 725/87 |
| 2009/0259588 A1 | 10/2009 | Lindsay | |
| 2010/0010944 A1* | 1/2010 | Cheng | G06F 16/436 706/12 |
| 2011/0154022 A1* | 6/2011 | Cheng | H04W 4/00 713/154 |
| 2011/0180598 A1 | 7/2011 | Morgan et al. | |
| 2012/0030773 A1* | 2/2012 | Schwesig | H04N 21/00 726/28 |
| 2012/0117271 A1* | 5/2012 | Kennedy | G06F 16/273 709/248 |
| 2013/0013501 A1 | 1/2013 | Rackley, III et al. | |
| 2013/0179526 A1 | 7/2013 | Kurashima | |
| 2013/0260734 A1* | 10/2013 | Jain | H04W 12/06 455/418 |
| 2014/0006977 A1* | 1/2014 | Adams | H04L 12/1818 715/758 |
| 2016/0380976 A1 | 12/2016 | Dhandayuthapani et al. | |

OTHER PUBLICATIONS

International Bureau, "International Search Report," issued in connection with application No. PCT/US2016/034139, dated Sep. 12, 2016, 3 pages.

International Bureau, "Written Opinion of the International Searching Authority," issued in connection with Application No. PCT/US2016/034139, dated Sep. 12, 2016, 7 pages.

European Patent Office, "Extended European Search Report," issued in connection with application No. EP16814965.6, dated Dec. 14, 2018, 8 pages.

United States Patent and Trademark Office, "Non-Final Office Action", issued in connection with U.S. Appl. No. 14/750,782 dated Jan. 11, 2018, 13 pages.

United States Patent and Trademark Office, "Final Office Action", issued in connection with U.S. Appl. No. 14/750,782 dated Sep. 7, 2018, 30 pages.

United States Patent and Trademark Office, Notice of Allowance and Fee(s) Due, issued in connection with U.S. Appl. No. 14/750,782 dated Nov. 28, 2018, 7 pages.

United States Patent and Trademark Office, "Non-Final Office Action", issued in connection with U.S. Appl. No. 14/750,782 dated Mar. 30, 2017, 11 pages.

United States Patent and Trademark Office, "Final Office Action", issued in connection with U.S. Appl. No. 14/750,782 dated Jul. 26, 2017, 14 pages.

United States Patent and Trademark Office, Notice of Allowance and Fee(s) Due, issued in connection with U.S. Appl. No. 14/750,782 dated Jan. 29, 2019, 8 pages.

China National Intellectual Property Administration, "Notice on the First Office Action", issued in connection with Chinese Patent Application No. 201680036848.7, dated Apr. 9, 2020, (17 pages).

European Patent Office, "Communication under Rule 94(3) EPC", issued in connection with European Patent Application No. 16814965.6, dated Feb. 3, 2020, (4 pages).

European Patent Office, "Communication pursuant to Article 94(3)", issued in connection with European Patent Application No. 16814965.6, dated Oct. 20, 2020, (4 pages).

China National Intellectual Property Administration, "Notice on Grant of Patent Right For Invention", issued in connection with Chinese Patent Application No. 201680036848.7, dated Oct. 28, 2020, (4 pages).

English Translation of the "Notice on the First Office Action", issued in connection with Chinese Patent Application No. 201680036848.7, dated Apr. 9, 2020, English Translation Retrieved dated Aug. 13, 2020 (10 pages).

* cited by examiner

SINGLE SOLUTION FOR USER ASSET CONTROL

RELATED APPLICATION

This patent arises from a continuation of U.S. patent application Ser. No. 14/750,782, (Now U.S. Pat. No. 10,326, 856) which was filed on Jun. 25, 2015. U.S. patent application Ser. No. 14/750,782 is hereby incorporated herein by reference in its entirety. Priority to U.S. patent application Ser. No. 14/750,782 is hereby claimed.

TECHNICAL FIELD

Embodiments described herein generally relate to a technique for providing a way to secure a person's digital life, in particular providing a single aggregation point between the person and independent online services that can control the person's digital life upon a trigger event.

BACKGROUND ART

For a long time, services have existed which provided a one-call solution to the problem of a lost/stolen wallet. These services ensure that all your credit cards are blocked, replacements are ordered, and your financial losses from the theft are mitigated as much as possible.

Today, our digital lives require the same solution. In the event of someone stealing your digital identity, perhaps by obtaining one of your online passwords, would it not be valuable to have a service which automatically changed or disabled all your credentials for your online life, protecting your social networks, email access, banking passwords, health information etc.?

Today we might panic due to loss of a wallet, a theft in the house, or a robbery. While panicking is a natural reaction, what we aspire to today is a sophisticated solution, that could lock or block access to all our assets (physical or digital) simply and easily, irrespective of the location someone is in.

Such a service could be used for example, a) after a retail breach to change all your online passwords; b) after a mobile device is stolen that was not secured with a pin; c) by relations or legal representatives post death, to block or secure future access to your digital life; d) by a trusted third party after an aggressive act by an oppressive regime, to prevent government access to data without legal process; or e) on confiscation of a device to prevent self-incrimination.

The existing blocking and asset control mechanisms require users to memorize every service or asset means, such as all the cards, the bank or other organization to which they belong, find their own protocol and call center contacts, and then explain the loss. That procedure is tiresome and time consuming for anyone who is already threatened with risk to one or more of their assets, which can bring about mental agony and possibly even physical injury.

DESCRIPTION OF EMBODIMENTS

Figure 1:
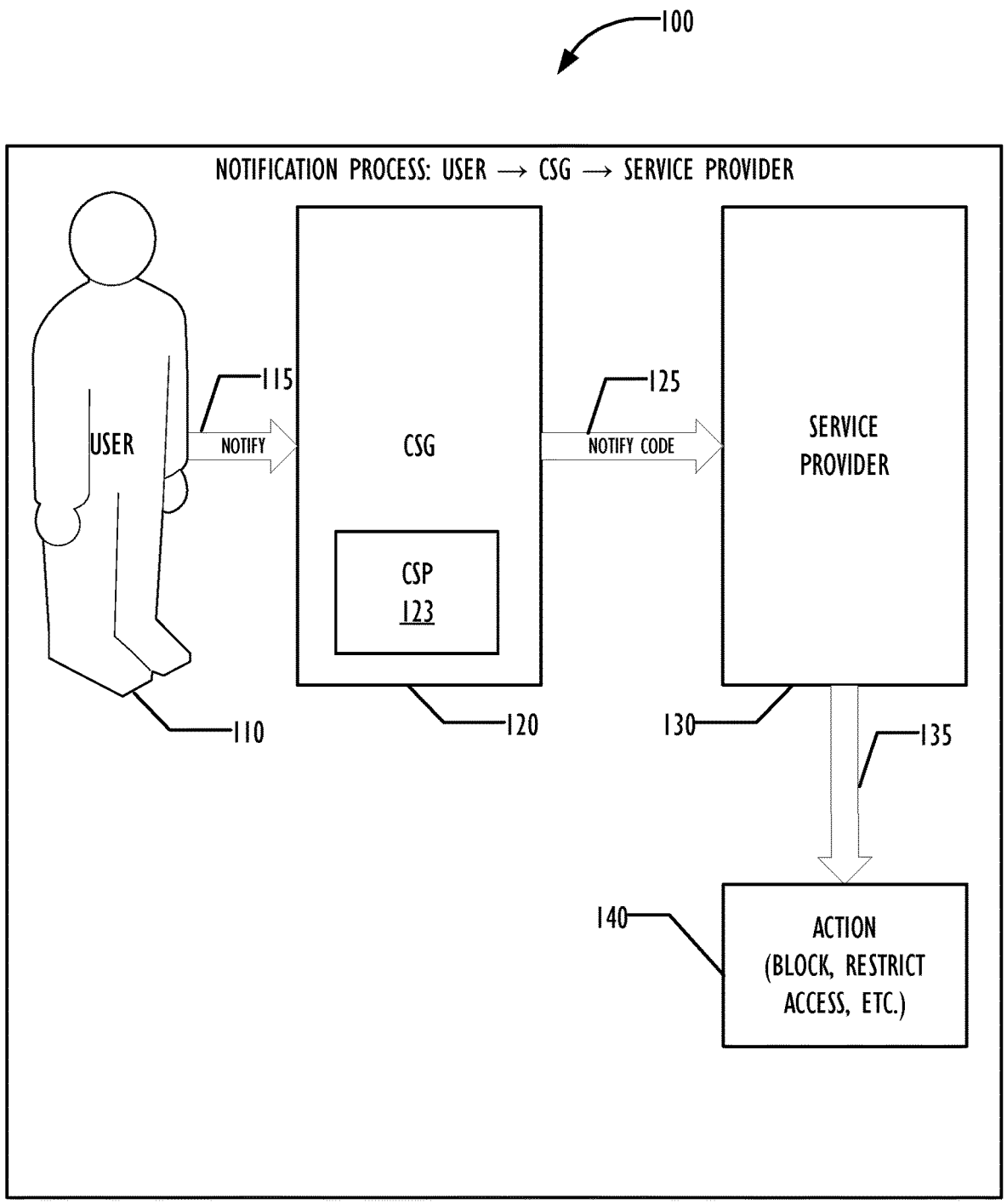
FIG. 1 is a block diagram illustrating a system for allowing a user to notify a Common SOS Gateway to notify a plurality of service providers to take an action, according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer or a plurality of computers working together to perform the function described as being performed on or by a computer system.

As described in more detail below, an "SOS" or "Panic Button" service secures a person's digital life, providing a single aggregation point between the person and numerous independent online services, allowing actions such as change password, secure account, delete data, etc., to be performed across said numerous services by a single trigger event such as a digital compromise.

In addition, an "SOS Gateway" described in more detail below provides an online service that when triggered causes protective measures to be put into place to secure a person's digital life. Such a service can be triggered manually by the owner of the digital information (post-theft, for example), by the loss of communication to a device (mobile phone, wearable, etc.), by a nominated third party (such as a parent, spouse, or legal representative), or perhaps at a timed event.

The services described below can support measures such as "change password," "disable account," "delete account," etc.

In one embodiment, the service architecture comprises a web portal, coupled with unique "brokers" that understand how to interact with a particular service, for example, FaceBook®, Google+™ Gmail®, Hotmail®, Dropbox®, etc. (FACEBOOK is a registered trademark of Facebook, Inc.; GOOGLE+ is a trademark of Google, Inc.; GMAIL is a registered trademark of Google, Inc.; HOTMAIL is a registered trademark of Microsoft Corporation; DROPBOX is a registered trademark of Dropbox, Inc.)

In addition an Application Programming Interface (API) is proposed to allow third party applications to interact with this service architecture, for example to allow a wearable manufacturer to trigger the service if a smartwatch is removed from a user's wrist.

Known solutions to restrict access to resources or accounts are standalone solutions that are neither unified nor integrated to any common authority. The disclosed system proposes an integrated and automated approach to unify operation of block or restrict actions on a number of assets without compromising authentication information. In addition, the system described below provides a time limited block action, cutting across different asset categories, which greatly enhances the user's flexibility to take SOS decisions without any manual intervention of the service providers and limits the dependence on a superficial manual procedure or protocol.

Example Use Cases:

1. A member of the press is apprehended in an oppressive regime. The individual is a frequent blogger and has many articles antagonistic to the regime stored on the Google Drive service provided by Google, Inc. The user's email contains correspondence from other people antagonistic to the regime. Because the person is in custody and their phone has been confiscated along with their laptop, the person's only protection is the strength of their passwords, which the individual may be forced to give up under torture.

A trusted colleague is aware of the arrest. Once the situation is established, this trusted colleague triggers the SOS gateway, causing owner's passwords to be changed for their online services, disabling or wiping their blog, and disabling or wiping their Google Drive account. The gateway triggers a "theft or erase" function on the owner's phone, which will be triggered if the phone is turned on. This widespread "detonation" protects the other antagonistic people from exposure, as well as possibly destroying evidence against the owner.

2. An individual is the victim of an email password compromise. They realize they have lost control over the account, but fear that other online services might be compromised now through a "password reset" attack. The user triggers the SOS service, which changes the password for that email account, and also resets email addresses for all of their online services, securing them from further exploitation.

3. A user is arrested and required to hand over their phone. The user fears that their digital life may incriminate them further, but is legally required to give the authorities their pin or fingerprint, for example due to the Regulation of Investigatory Powers Act (RIPA) in the United Kingdom. Some courts have held that a person in custody may be required to provide their fingerprint to unlock their mobile devices. For example, a Virginia Circuit Court judge has ruled that while police officers cannot compel a person to give up their passcode, they can demand someone use their fingerprint to unlock their phone. Disclosed embodiments allow the user to set up a time-based policy that erases their phone if the phone is offline for more than a threshold amount of time, such as 3 hours. This is triggered by the SOS server. When the user gives their fingerprint to the police, the phone wakes up and erases, thwarting the attempt to gain access to data on the phone.

4. A person identifies one or more representatives to the SOS system who are authorized to take control over the user's digital life upon the death or incapacity of the person. The representatives may then delete digital life information when they learn of the person's death or take steps to preserve the digital life information, make death announcements in appropriate places, etc.

Involved Entities and their Functions:

A) Service Providers (SP)

The Service providers can be financial institutions, telecom operators, enterprises and corporates, web-services providers (Email, cloud storage), webmasters, social account providers, etc. The term includes all those entities that provide online or offline assets to the public at large. On one hand, the protection of those assets is a responsibility of the end-user, but providing a safe environment is a responsibility of the SP. Embodiments of SPs typically:

1. Define the assets and resources belonging to their user base and integrate those assets and resources with a Common SOS Gateway (CSG), (described below)

2. Provide a real time subscription service registering their accounts and customer base with the CSG.

3. Enroll the type of accounts and assets that a user has agreed to integrate with the CSG.

4. Identify users and their accounts in a way to protect their identities. In some embodiments, SPs may use an irreversible hash function for that purpose.

5. Provide users with an option to accept or reject registering the service with CSG.

B) Brokers

A number of "broker" engines are provided in various embodiments. The broker engines each know how to interface with a single SP system, and expose a common API to the SOS gateway service. The brokers collectively normalize the individual functions of all the SPs. For example, the act of changing a password within FaceBook, and within Google+ require completely different APIs. In embodiments described below, each service would be interact with a unique broker. A user can then can change the password of both services simply by requesting that action from both brokers.

B) Users:

The public at large, i.e., consumers and the ultimate owners of different assets provided by the SP's. Users typically can:

1. Own an asset and are responsible to convey actionable information to the CSG by one of the ways described below.

2. Exercise the options by accessing a Common Subscription Portal (CSP), hosted by the CSG that gives the users information about the type of accounts and assets one might have with different SPs. This is a one-time exercise similar to registering your account online.

3. Modify or deregister a service or a part thereof.

4. Enroll or opt out of a service through a convenient user interface, such as a check-box.

In some embodiments, users may have an option to use either a unique short key for each asset or a common key for all the assets.

Typically a user may interact with the CSG using one or more of:

a) a custom device (such as a wearable or a security key) having a simple user interface, such as couple of buttons, and a user registered sequence to trigger an action;

b) a short text message to a specified toll-free telephone number that carries out user actions based after authenticating the user;

c) a mobile app, requiring authentication, but providing easy access to actions afterwards;

d) an interactive voice response system (IVRS);

e) an authentication token provided by the CSG and further validated via a one-time password (OTP);

f) an email message; or g) an SOS email text chosen by the user, and sent from a registered email address.

These techniques are illustrative and by way of example only, and other user interaction types can be provided.

C) Common SOS Gateway (CSG)

The CSG provides a gateway between users and SP, providing users a common interface for instructing actions related to their digital life. The CSG may then interact with the SPs, possibly through brokers customized for that SP, to effect the user's instructions. As described in more detail below, the CSG may also take actions automatically based on prior user instructions upon the occurrence of a triggering event, including the expiration of a time period. Functions of the CSG include:

1. Universal authority to register/deregister service providers and their resources (user base).

2. Register the valid actions on each of the assets such as block, restrict for "n" units of time, or block only part of a service, e.g. making a deposit account restricted for any withdrawals of currency while allowing deposits.

3. Host a CSP and authenticate users to the different assets they hold and provide the register and de-register mechanism as per 1 above.

FIG. 1 is a block diagram 100 illustrating a user 110 interacting with a CSG 120 to control user 110's digital assets according to one embodiment. Diagram 100 assumes the user has already registered with the CSG 120, which knows how to interact with the SP 130 to request the SP 130 to perform the desired action. In this example, the user 110 sends a notification request 115 to the CSG 120, identifying the SP 130 and the desired action 140, such as block, delete, etc. The CSG 120 authenticates the user 110, then requests the SP 130 to perform the desired action using request notification 125. Upon receiving the request 125, the SP 130 may then perform the desired action 140, using whatever mechanism 135 the SP has defined for performing the desired action 140. Neither the user 110 nor the CSG 120 need to be aware of mechanism 135. The user 110 need not be aware of the way in which the CSG 120 communicates with the SP 130.

If all SPs 130 employed a standard mechanism for the CSG 120 to send the request 125 to the SP 130, including all necessary authentication information, a single CSG 120 might suffice. However, because SPs 130 may employ different authentication and request mechanisms, typically using an SP-specific API, embodiments may employ a brokered technique as illustrated in FIG. 2.

As illustrated in FIG. 1, CSG 120 hosts or includes a CSP 123 that performs user registration and deregistration functions as well as user configuration functions. In some embodiments, the CSP 123 may be implemented remotely to the CSG 120 if desired.

Figure 2:
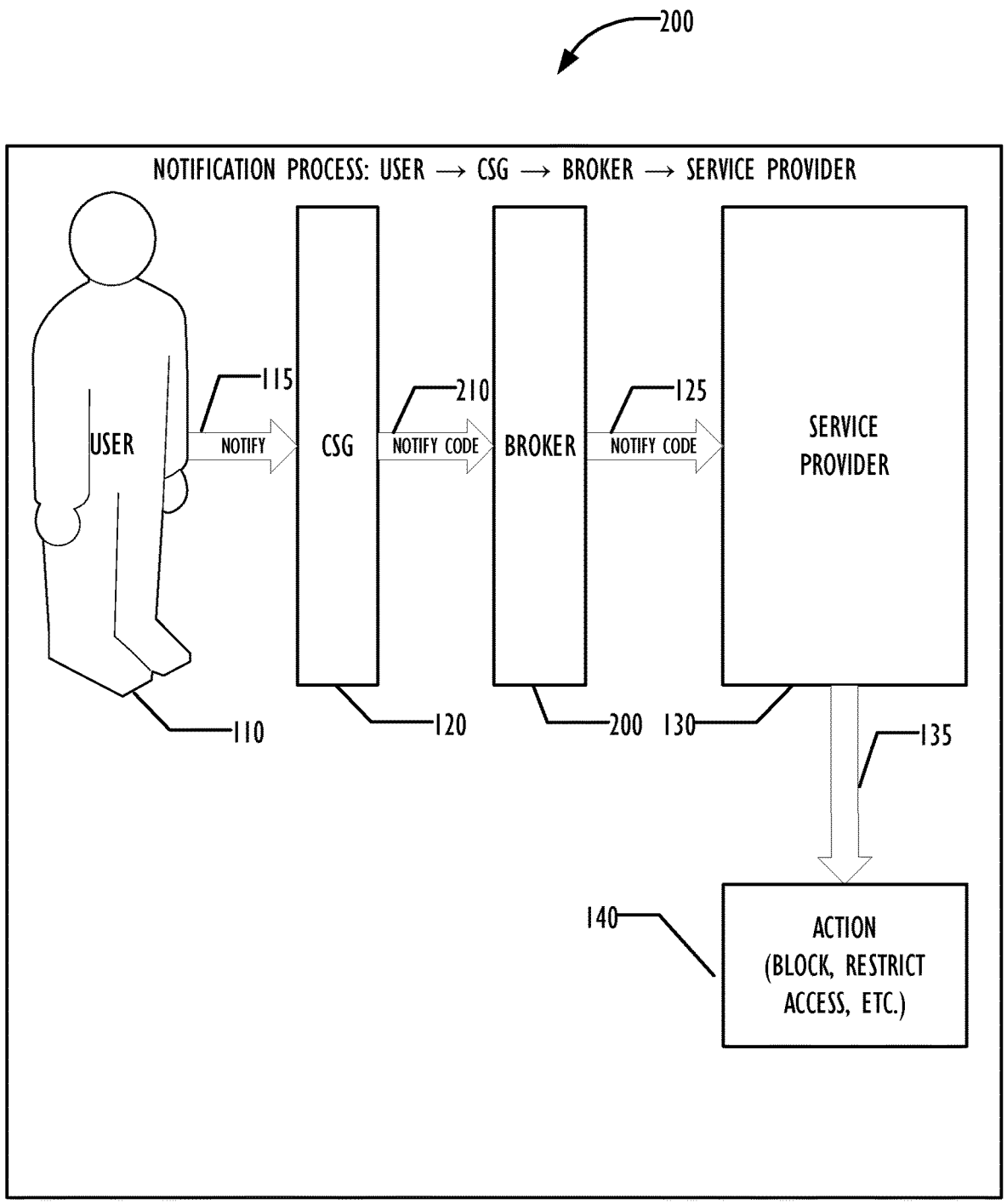
FIG. 2 is a block diagram illustrating a system for allowing a user to notify a common SOS Gateway to notify a plurality of service providers to take an action, according to another embodiment.

In FIG. 2, the user continues to communicate with the CSG 120 and the SP 130 performs the requested action 140 as in FIG. 1. However, in such an embodiment, the CSG 120 may now communicate with a broker 200 using a request protocol 210 instead of directly with the SP 130. The broker 200 is configured to use a common API or communication mechanism with the CSG 120 and may be configured specifically for communicating with the SP 130, providing the request 125 in the way required by the SP 130. Although only one broker 200 and SP 130 is illustrated in FIG. 2, the CSG 120 may communicate with a plurality of SPs 130 using a plurality of brokers 200, with each broker 200 configured to communicate with the corresponding SP 130. In some embodiments, where multiple SPs 130 use a common API or other communication technique, a single broker 200 may communicate with multiple SPs 130. In some embodiments, a broker 200 may be configured with multiple communication techniques, allowing the broker 200 to communicate with a plurality of SPs 130 using different communication techniques.

Although only a single CSG 120 is illustrated in FIGS. 1-2, embodiments may employ a plurality of CSGs 120 using load balancing or other load sharing and redundancy techniques to provide a redundant and high performance system of CSG 120. However, such multiple CSG embodiments would typically be invisible to the user 110, who would see the CSG system as being a single CSG 120. Similarly, embodiments may employ a plurality of brokers 200 that communicate with SP 130 for load balancing or other reasons to provide a reliable system for communicating between the CSG 120 and the SPs 130.

Figure 3:
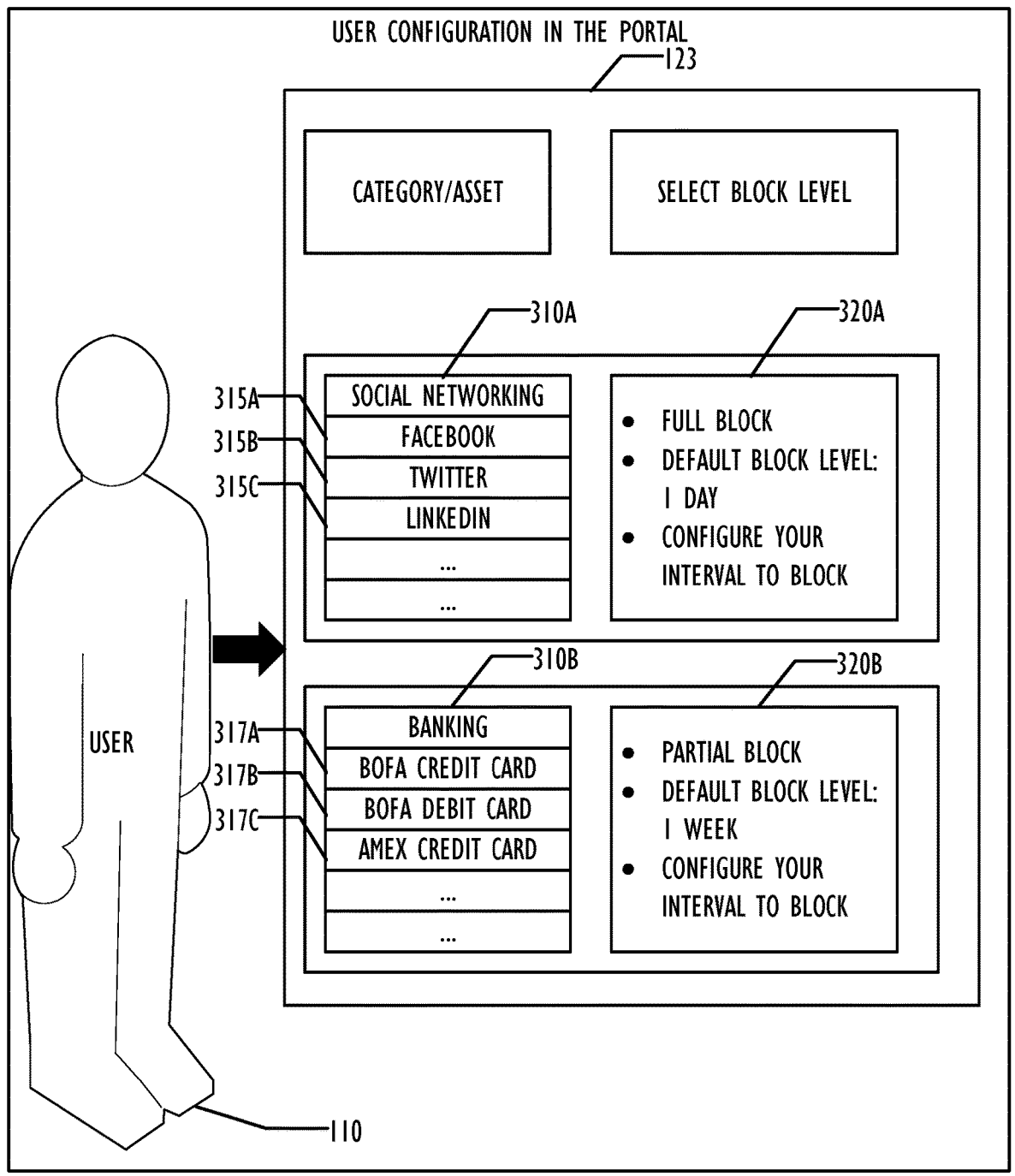
FIGS. 3-4 are block diagrams illustrating user configuration of a Common Subscription Portal according to one embodiment.
Figure 4:
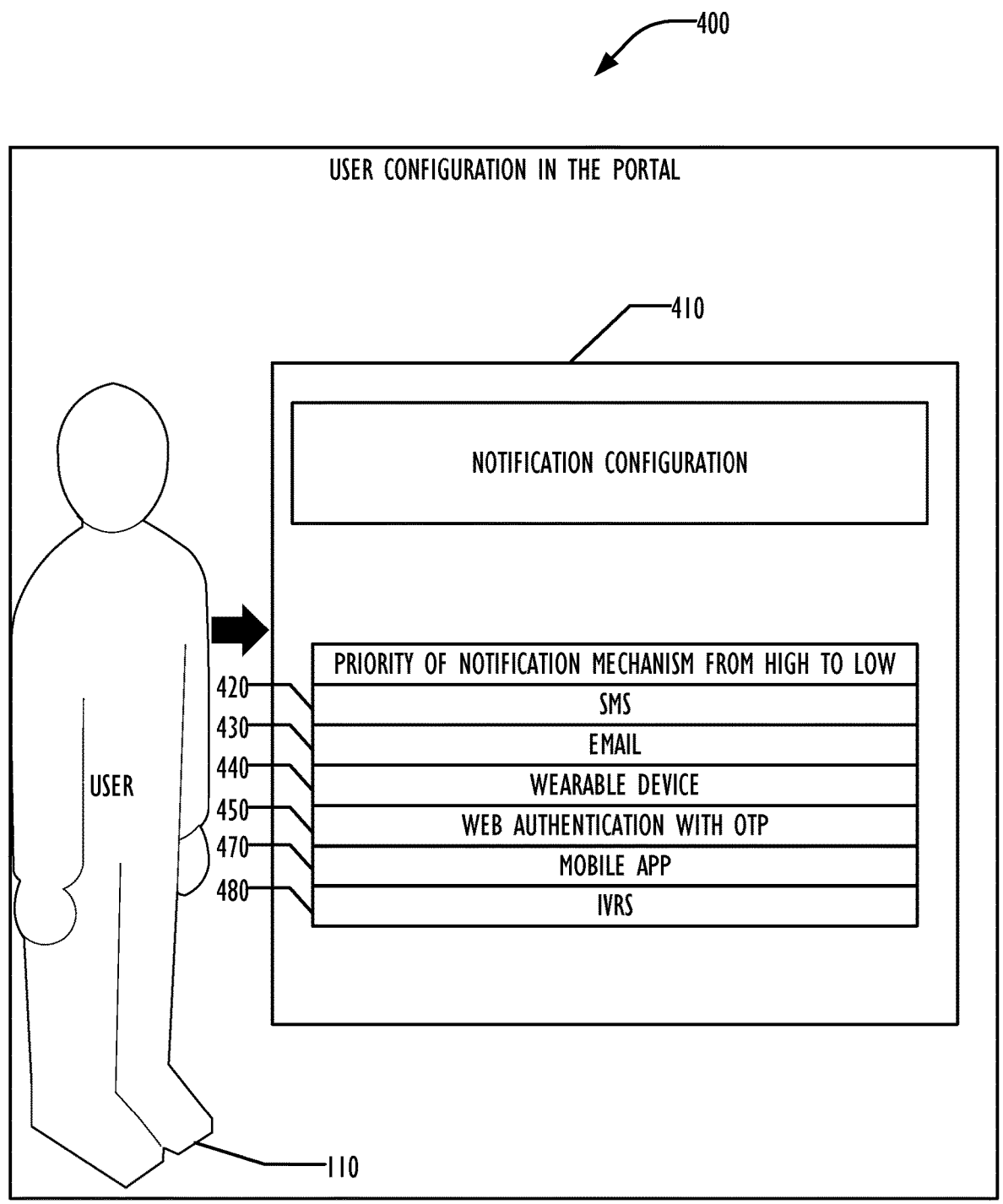

FIGS. 3-4 illustrate various user configuration functionality according to various embodiments. FIG. 3 illustrates configuring actions that a user may configure, while FIG. 4 illustrates configuring a way for the user to notify the CSG 120 to take a desired action.

In one embodiment, illustrated in FIG. 3, SPs 130 may be categorized or classified into groups, and actions be associated with those groups. For example, in FIG. 3, categories 310A (Social Networking) and 310B (Banking) are defined. These categories are illustrative and by way of example only, and other categories or classifications may be implemented. In category 310A, various social network sites that the CSG 120 is capable of interfacing with are listed, such as Facebook (315A), Twitter (315B), and LinkedIn (315C). These social network sites are illustrative and by way of example only, and other social network sites could be listed under category 315A. Similarly, under the banking category 310B, several credit card entities are listed, in this example Bank of America credit card (317A), Bank of America debit card (317B), and American Express credit card (317C).

A group action may be configured by the CSP 123. In FIG. 3, social networking entities 310A have an associated action 320A, allowing the user to block access to the listed social networking sites. In this example, a full block is configured to last for 1 day after notification by the user 110. The interval can be configured by the user as desired. The banking group entry could be the same as the social networking group entry, but in this example is configured as a partial block for 1 week.

Different kinds of partial blocks may be configured in various embodiments. For example, some embodiments may allow blocking any attempt to debit an account, such as by attempting to make a charge on a credit card or cash a check against a banking account, while continuing to allow deposits to the account, such as accepting a payment of a prior credit card bill.

As illustrated in FIG. 3, the action taken is defined as lasting for a configured time. Some embodiments may allow defining an action that lasts indefinitely, either until a reversal action is requested, or until some other predefined trigger event occurs. For example, a CSP 123 may allow a user 110 to block access to a digital asset until some further contact with the user 110, such as the user 110 personally visiting an establishment of the SP 130 or the user 110 responding correctly to a communication from the SP 130 or a related system.

The configuration functionality of FIG. 3 is defined at a group level. Various embodiments may also define default settings for the user 110 that can be applied to any group or entity for which no overriding group or single entity configuration is available, using similar configuration interfaces as used for the group configuration. Similarly, embodiments may allow the user 110 to specify a custom configuration for an individual entity that is different from the group setting for that category of entities. In such an embodiment, the group configuration would override the user default configuration, and the single entity configuration would override the group and default configurations.

Although illustrated in FIG. 3 as a "block level," other actions may be defined for the user 110. These actions may include deleting the digital asset or account, changing a password or other authentication information, or requesting the SP 130 to stop communicating with the user 110. These actions are illustrative and by way of example only, and any type of action that the SP 130 can offer may be made configurable by the user 110 in the CSP 123.

In some embodiments, the CSG 120 may also accept ad hoc requests, in which the user 110 specifies an action to be taken in the notification to the CSG 120. This action may be the same as or different from any action preconfigured by the user 110. In addition, the CSP 123 may define default actions, either for the user 110, a category or group of SPs 130, or a specific SP 130, so that a user may be able to skip configuration if the default actions defined by the CSP 123 are acceptable.

FIG. 4 is a block diagram 400 illustrating functionality for the user to define ways to provide notifications to the CSG 12—to cause either a predefined or ad hoc action to be taken by the SP 130. The CSP 123 in this example may list a plurality of possible notification mechanisms 410. In one embodiment, the list includes Short Messaging Service (SMS) text messages (420), an email message (430), a wearable device (440), web authentication with a one-time password (OTP) (450), a mobile app (470), and an IVRS (480). These notification types are illustrative and by way of example only, and other notification types may be implemented and accepted. In one embodiment, a user may define multiple acceptable notification mechanisms, and may prioritize those mechanisms as configured by the user. Similarly, embodiments may provide for the CSG to notify the user 110 when an action has been taken, and a similar configuration mechanism may provide for configuring the way in which the CSG 120 should send those notifications. The user 110 may configure the CSG to send only certain desired types of notifications. Some embodiments provide for the CSG 120 to send notifications to the user 110 in multiple forms. In such an embodiment, a priority order may be configured, telling the CSG 120 to send notifications in the priority order.

Figure 5:
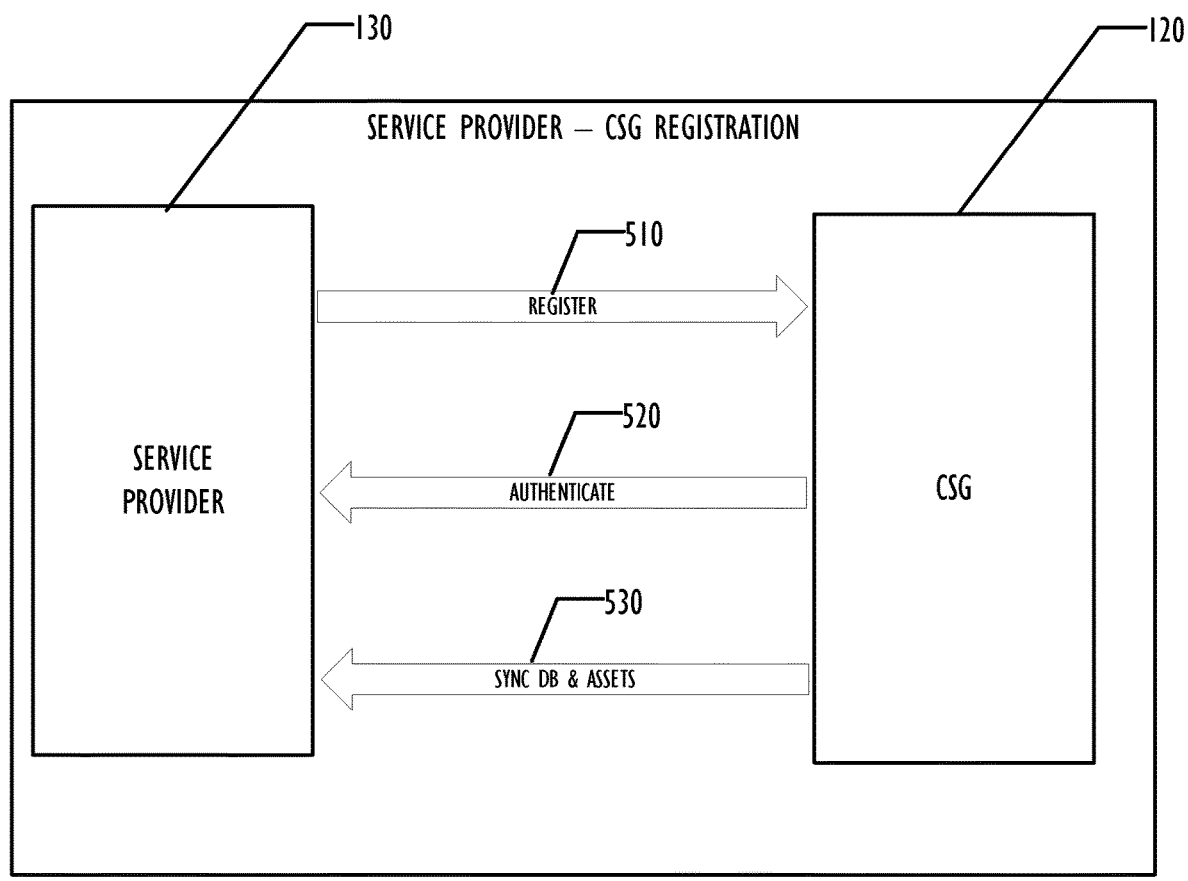
FIG. 5 is a block diagram illustrating interactions between a Common SOS Gateway and a Service Provider according to one embodiment.

FIG. 5 is a block diagram illustrating registration of a CSG 120 with an SP 130. In embodiments using brokers, such as in FIG. 2, the broker 200 may perform some or all of the registration activities as an intermediary for the CSG 120. The SP 130 may register in communication 510 with the CSG 120 using any desired communication protocol. In some embodiments, the CSG 120 may de-register the SP 130 at any time, such as when an SP no longer is trustworthy or fails to perform appropriately in interacting with the CSG 120.

The registration communication 510 may also include information about what types of resources are available at the SP 130 and what types of valid actions are possible for the CSG 120 to request on behalf of a user 110. Other information may be included in the registration communication 510. Although shown as transmitting information from the SP 130 to the CSG 120 in FIG. 5, embodiments have employ two-way communication in one or more steps to complete the registration of the SP 130 with the CSG 120.

In communication 520, the CSG 120 may authenticate itself to the SP 130 using any desired form of authentication. In addition, the CSG 120 may perform authentication of the user 110, then communicate acceptance of that authentication to the SP 130, avoiding the need for the user 110 to authenticate with the SP 130 directly. Any desired authentication technique may be used, typically involving an API defined by the SP 130 for trusted authentication by a third party. In embodiments where brokers 200 act as intermediaries between the CSG 120 and the SPs 130, authentication may performed on behalf of the user 110 with the SP 130 by the broker 200. For security reasons, all communication between the SP 130, the CSG 120, and any broker 200 is preferably cryptographically secured.

From time to time, the CSG 120 and the SP 130 may synchronize the information that they maintain in communication 530. For example, the SP 130 may notify the CSG 120 that the user has added or deleted accounts with the SP 130, allowing the CSG to update its enrollment information. Similarly, the CSG 120 may notify the SP 130 that the user 110 has enrolled an SP 130 account with the CSG 120. An SP 130 may use this mechanism to indicate that the CSG 120 is (or is not) allowed to issue commands on behalf of the user 110. Some SPs 130 may allow all their services to be used via the CSG 120; other SPs 130 may allow access only to services with lower security concerns, but prohibit use of the CSG 120 for control of access to higher security services.

Although in some scenarios, users 110 may manually trigger the CSG 120 to take necessary actions, such as after the theft of a smartphone or other device, automatic triggering actions may be supported in some embodiments. For example, a dormancy trigger may require the user 110 to take a certain action within a predefined time period; otherwise the dormancy event is triggered, causing the CSG 120 to instruct one or more of the SPs 130 to take an action. In another example, loss of communication with a mobile or wearable device may automatically trigger the CSG 120 to take an action. In another example, a user 110 may define one or more third parties to serve as a proxy for the user 110. The proxy can then take actions on behalf of the user 110 should the user 110 be unavailable, incapacitated, or die. In some embodiments, a plurality of third parties may be defined, with some subplurality of the plurality of third parties required to agree that a trigger event (such as death) has occurred before the triggered action may be performed, such as giving access to digital assets to one or more of the plurality of third parties. This is a current problem, because upon the death of an account holder, gaining access to digital assets of the account holder can be extremely difficult.

Any action supported by the SP 130 may be triggered in embodiments of such a system. Actions may be configured in the CSG 120 that may affect digital assets associated with a single SP 130 or with multiple SPs 130. For example, a user 110 who loses a wallet may notify the CSG 120 to take actions with a plurality of credit card companies, notifying them that the user 110's credit cards have been lost or stolen, and directing them to take an appropriate action, such as closing the accounts and issuing new credit cards with a new account number. A user 110 whose computer has been compromised may notify the CSG 120 of that event, causing the CSG 120 to request various SPs 130 to change passwords for the user 110.

The notification to the CSG 120 may also be generated by third parties in some embodiments. For example, a user 110 with a wearable device may enroll with the CSG 120 so that if the wearable device can detect that it is no longer in proximity to the user 110, such as being out of range of a smartphone or other mobile device belonging to the user 110, the wearable device may communicate directly or indirectly with the CSG 120 to trigger an action, such as shutting down the wearable device, or erasing personal data associated with the user 110 that might be compromised by the loss of the wearable device.

In some embodiments, the CSG 120, the SP 130, or both may send notifications to the user 110 when a trigger event has been recognized, either before or after taking the predefined action. For example, in some embodiments, the CSG 120 may notify the user 110 that a trigger event has been recognized, and that the SP 130 will be instructed to take the action unless the user 110 countermands the action within a certain time period. In embodiments where an action such as a change password action is performed as a result of a trigger event, the SP 130 may communicate with the user 110 to provide necessary information for continued access to the digital assets associated with that SP 130. Where a credit card account is changed, such as upon reporting loss of a credit card, the SP 130 may send a new credit card to the user 110 by mail, as well as reporting the event to the user by message or email. Any number of different actions and trigger events may be configured in embodiments of such a system. The ability to cause automated actions across a plurality of SPs 130 without compromising the authentication of the user 110 provides a highly valuable user experience.

The CSG 120 preferably does not store user authentication information in any form that can be directly used, such as an unencrypted password. Instead, the CSG 120 (and brokers 200) preferably interact with the SPs 130 as trusted authentication agents, allowing the CSG 120 to authenticate the user 110 using any desired authentication mechanism, then communicate with the SP 130 using an authentication API that securely allows the SP 130 to trust the authentication performed by the CSG 120, without requiring further authentication interactions with the user 110. In some embodiments, users may configure a key or personal identification number (PIN) for use when authenticating a notification to the CSG 120 for a specific SP 130 or a specific service of an SP 130. Similarly, embodiments may allow a common key or PIN that may be used as an authentication token for all of the assets enrolled by the user in such a system.

When brokers 200 are involved, a common protocol or API can be used to communicate with the brokers 200, even though the individual brokers 200 may use completely different communication techniques to perform the unique interactions required by different SPs 130.

Figure 6:
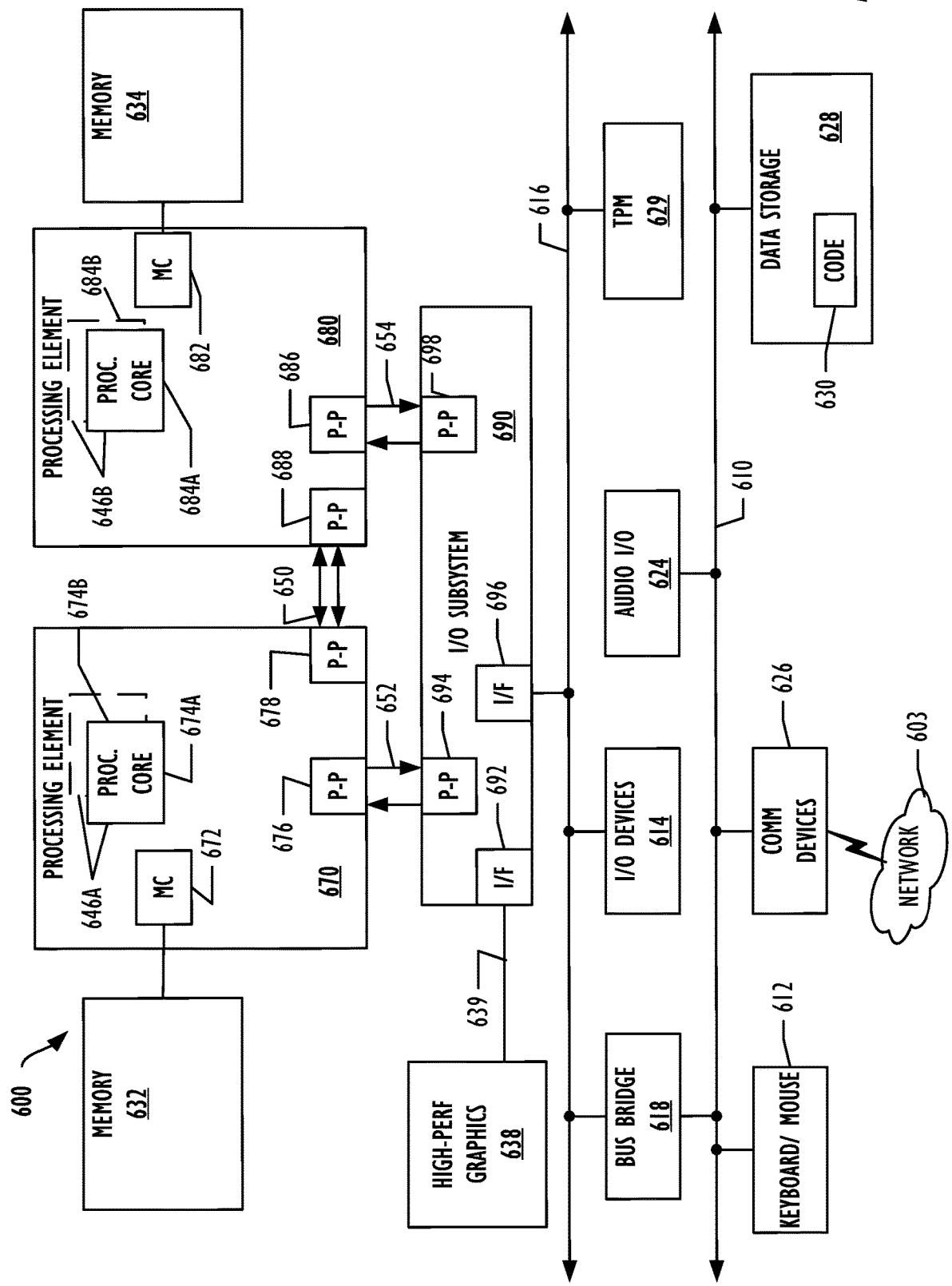
FIGS. 6 and 7 are block diagrams illustrating programmable devices that may be used for implementing management consoles and managed devices according to various embodiments.
Figure 8:
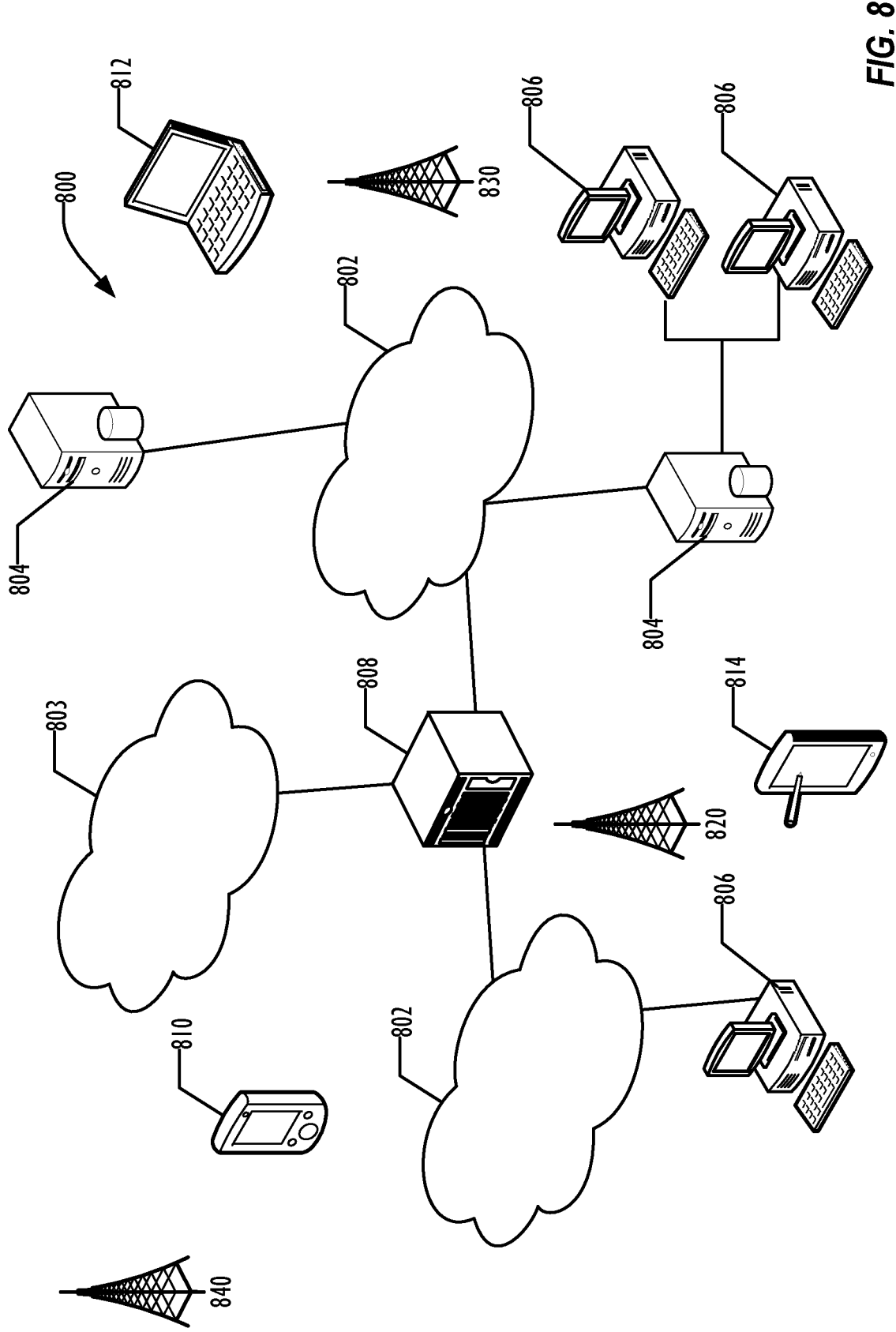
FIG. 8 is a block diagram illustrating an infrastructure in which techniques described below may be implemented according to one embodiment.

Referring now to FIG. 8, a block diagram illustrates a programmable device 600 that may be used for either the CSG 120 or the brokers 200 in accordance with one embodiment. The programmable device illustrated in FIG. 6 is a multiprocessor programmable device 600 that includes a first processing element 670 and a second processing element 680. While two processing elements 670 and 680 are shown, an embodiment of programmable device 600 may also include only one such processing element.

Programmable device 600 is illustrated as a point-to-point interconnect system, in which the first processing element 670 and second processing element 680 are coupled via a point-to-point interconnect 650. Any or all of the interconnects illustrated in FIG. 6 may be implemented as multi-drop bus rather than point-to-point interconnects.

As illustrated in FIG. 6, each of processing elements 670 and 680 may be multicore processors, including first and second processor cores (i.e., processor cores 674a and 674b and processor cores 684a and 684b). Such cores 674a, 674b, 684a, 684b may be configured to execute instruction code for performing the CSG and broker functionality described above. However, other embodiments may use processing elements that are single core processors as desired. In embodiments with multiple processing elements 670, 680, each processing element may be implemented with different numbers of cores as desired.

Each processing element 670, 680 may include at least one shared cache 646. The shared cache 646a, 646b may store data (e.g., instructions) that are utilized by one or more components of the processing element, such as the cores 674a, 674b and 684a, 684b, respectively. For example, the shared cache may locally cache data stored in a memory 632, 634 for faster access by components of the processing elements 670, 680. In one or more embodiments, the shared cache 646a, 646b may include one or more mid-level caches, such as level 2 (L2), level 3 (L3), level 4 (L4), or other levels of cache, a last level cache (LLC), or combinations thereof.

While FIG. 6 illustrates a programmable device with two processing elements 670, 680 for clarity of the drawing, the scope of the present invention is not so limited and any number of processing elements may be present. Alternatively, one or more of processing elements 670, 680 may be an element other than a processor, such as an graphics processing unit (GPU), a digital signal processing (DSP) unit, a field programmable gate array, or any other programmable processing element. Processing element 680 may be heterogeneous or asymmetric to processing element 670. There may be a variety of differences between the processing elements 670, 680 in terms of a spectrum of metrics of merit including architectural, microarchitectural, thermal, power consumption characteristics, and the like. These differences may effectively manifest themselves as asymmetry and heterogeneity amongst the processing elements 670, 680. In some embodiments, the various processing elements 670, 680 may reside in the same die package.

First processing element 670 may further include memory controller logic (MC) 672 and point-to-point (P-P) interfaces 676 and 678. Similarly, second processing element 680 may include a MC 682 and P-P interfaces 686 and 688. As illustrated in FIG. 6, MCs 672 and 682 couple the processing elements 670, 680 to respective memories, namely a memory 632 and a memory 634, which may be portions of main memory locally attached to the respective processors. While MC logic 672 and 682 is illustrated as integrated into the processing elements 670, 680, in some embodiments the MC logic may be discrete logic outside the processing elements 670, 680 rather than integrated therein.

Processing element 670 and processing element 680 may be coupled to an I/O subsystem 690 via P-P interfaces 676 and 686 and P-P interconnects 652 and 654, respectively. As illustrated in FIG. 6, I/O subsystem 690 includes P-P interfaces 694 and 698. Furthermore, I/O subsystem 690 includes an interface 692 to couple I/O subsystem 690 with a high performance graphics engine 638. In one embodiment, bus 639 may be used to couple graphics engine 638 to I/O subsystem 690. Alternately, a point-to-point interconnect 639 may couple these components.

In turn, I/O subsystem 690 may be coupled to a first link 616 via an interface 696. In one embodiment, first link 616 may be a Peripheral Component Interconnect (PCI) bus, or a bus such as a PCI Express bus or another I/O interconnect bus, although the scope of the present invention is not so limited.

As illustrated in FIG. 6, various I/O devices 614 may be coupled to first link 616, along with a bridge 618 which may couple first link 616 to a second link 610. In one embodiment, second link 610 may be a low pin count (LPC) bus. Various devices may be coupled to second link 610 including, for example, a keyboard/mouse 612, communication device(s) 626 (which may in turn be in communication with the computer network 603), and a data storage unit 628 such as a disk drive or other mass storage device which may include code 630, in one embodiment. The code 630 may include instructions for performing embodiments of one or more of the techniques described above. Further, an audio I/O 624 may be coupled to second bus 610.

A trusted program module (TPM) 629 may be coupled to the I/O subsystem 690 or elsewhere in the programmable device 600 for providing the TEE 710 or 750. The TPM 629 typically is cryptographically controlled and restricts execution to only executable code signed with a cryptographic key. The TPM 629 may be implemented as a separate chip or chipset from the processing elements, or may be packaged as part of a chipset providing some or all of the elements illustrated in FIG. 6.

Note that other embodiments are contemplated. For example, instead of the point-to-point architecture of FIG. 6, a system may implement a multi-drop bus or another such communication topology. Although links 616 and 610 are illustrated as busses in FIG. 6, any desired type of link may be used. In addition, the elements of FIG. 6 may alternatively be partitioned using more or fewer integrated chips than illustrated in FIG. 6. For example, the components may be implemented as networked (LAN, enterprise network, Internet and/or distributed in the cloud) computing devices (real or virtual) or microcontrollers which jointly perform the 230 function.

Figure 7:
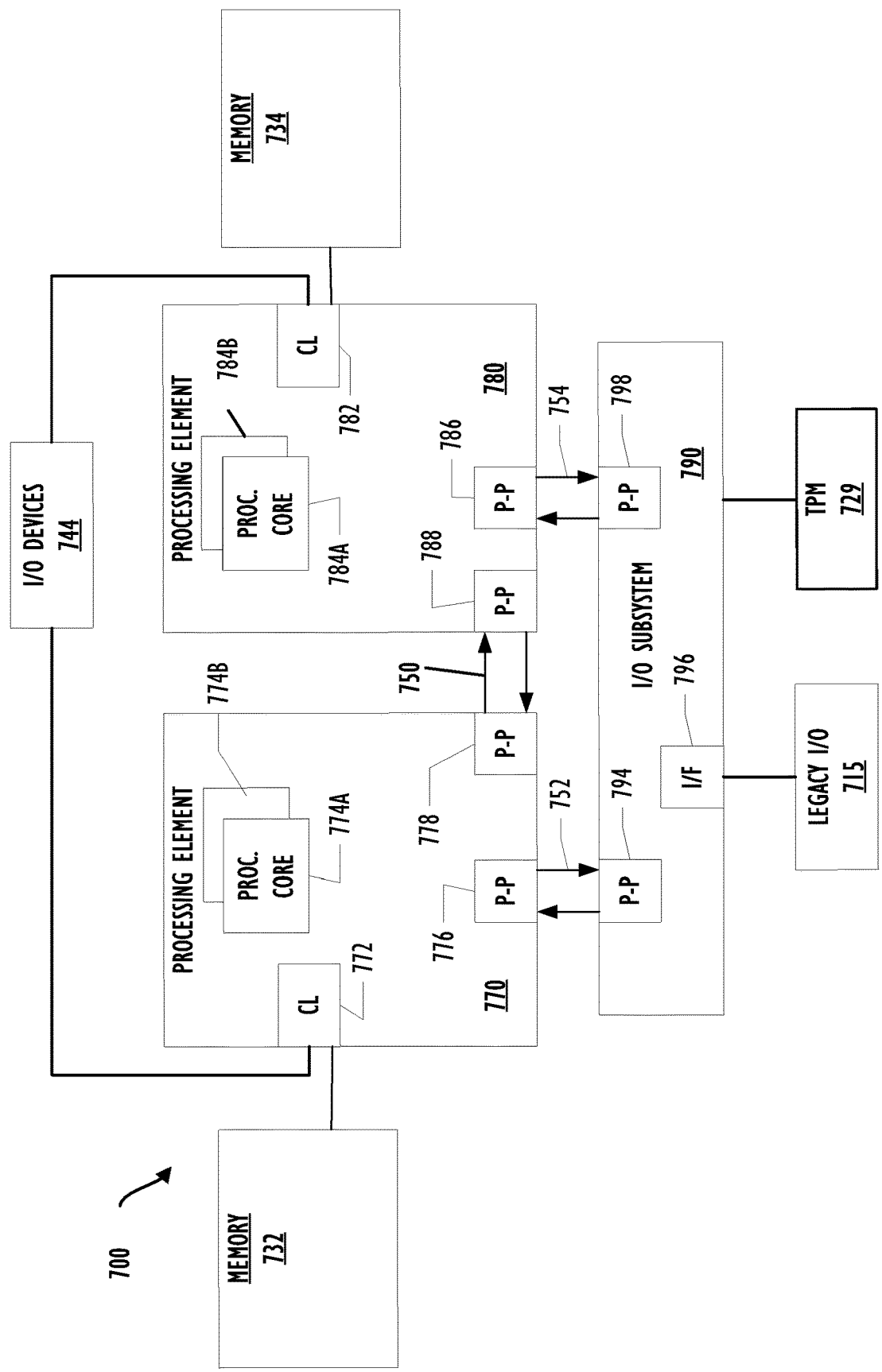

Referring now to FIG. 7, a block diagram illustrates a programmable device 700 according to another embodiment. Certain aspects of FIG. 6 have been omitted from FIG. 7 in order to avoid obscuring other aspects of FIG. 7.

FIG. 7 illustrates that processing elements 770, 780 may include integrated memory and I/O control logic ("CL") 772 and 782, respectively. In some embodiments, the CL 772, 782 may include memory control logic (MC) such as that described above in connection with FIG. 6. In addition, CL 772, 782 may also include I/O control logic. FIG. 7 illustrates that not only may the memories 732, 734 be coupled to the CL 772, 782, but also that I/O devices 744 may also be coupled to the control logic 772, 782. Legacy I/O devices 715 may be coupled to the I/O subsystem 790 by interface 796. Each processing element 770, 780 may include multiple processor cores, illustrated in FIG. 7 as processor cores 774A, 774B, 784A, and 784B. As illustrated in FIG. 7, I/O subsystem 790 includes P-P interfaces 794 and 798 that connect to P-P interfaces 776 and 786 of the processing elements 770 and 780 with interconnects 752 and 754. Processing elements 770 and 780 may also be interconnected by interconnect 750 and interfaces 778 and 788, respectively.

As with the programmable device 600, the programmable device 700 may contain a TPM 729.

The programmable devices depicted in FIGS. 6 and 7 are schematic illustrations of embodiments of programmable devices that may be utilized to implement various embodiments discussed herein. Various components of the programmable devices depicted in FIGS. 6 and 7 may be combined in a system-on-a-chip (SoC) architecture.

Referring now to FIG. 8, an example infrastructure 800 in which the techniques described above may be implemented is illustrated schematically. Infrastructure 800 contains computer networks 802. Computer networks 802 may include many different types of computer networks available today, such as the Internet, a corporate network, or a Local Area Network (LAN). Each of these networks can contain wired or wireless programmable devices and operate using any number of network protocols (e.g., TCP/IP). Networks 802 may be connected to gateways and routers (represented by 808), end user computers 806, and computer servers 804. Infrastructure 800 also includes cellular network 803 for use with mobile communication devices. Mobile cellular networks support mobile phones and many other types of devices. Mobile devices in the infrastructure 800 are illustrated as mobile phones 810, laptops 812, and tablets 814. A mobile device such as mobile phone 810 may interact with one or more mobile provider networks as the mobile device moves, typically interacting with a plurality of mobile network towers 820, 830, and 840 for connecting to the cellular network 803. Although referred to as a cellular network in FIG. 8, a mobile device may interact with towers of more than one provider network, as well as with multiple non-cellular devices such as wireless access points and routers 808. In addition, the mobile devices 810, 812, and 814 may interact with non-mobile devices such as computers 804 and 806 for desired services, which may include providing the application to user agent mapping and analysis services described above. The functionality of the CSG 120 and brokers 200 may be implemented in any device or combination of devices illustrated in FIG. 8; however, most commonly is implemented in a server computer such as server 704. Each SP 130 may employ its own provider-specific infrastructure, which may not be visible external to the SP 130, and which is not important for the current disclosure. However, typically each 130 may employ one or more servers such as server 804 for processing requests such as are described above.

The following examples pertain to further embodiments.

Example 1 is a system for allowing access to digital assets of a person that are managed by a plurality of service providers, comprising: a gateway system, comprising: one or more processors; and a memory, coupled to the one or more processors, on which are stored instructions, comprising instructions that when executed cause the one or more processors to: receive an indication of a trigger event corresponding to the person; authenticate the person; and notify through a trusted authentication interface at least some of the plurality of services providers to take a preconfigured action on the digital assets managed by the at least some of the plurality of services providers, responsive to the trigger event.

In Example 2 the subject matter of Example 1 optionally includes wherein the preconfigured action comprises blocking access to the digital assets.

In Example 3 the subject matter of Example 1 optionally includes wherein the preconfigured action comprises deleting the digital assets.

In Example 4 the subject matter of Example 1 optionally includes wherein the preconfigured action comprises changing a password corresponding to the person.

In Example 5 the subject matter of Examples 1-4 optionally includes wherein the indication of the trigger event comprises a notification received from the person.

In Example 6 the subject matter of Examples 1-4 optionally includes wherein the trigger event comprises an automatically detected event.

In Example 7 the subject matter of Examples 1-4 optionally includes further comprising: a plurality of brokers, each corresponding to a member of the plurality of service providers, each comprising: one or more broker processors; and a broker memory, coupled to the one or more broker processors, on which are stored instructions that when executed cause the one or more broker processors to: receive a notification from the gateway system to instruct the corresponding member of the plurality of service providers to take the preconfigured action; and send a notification specifically configured for the corresponding member of the plurality of service providers to the corresponding member of the plurality of service providers, the notification instructing the corresponding member of the plurality of service providers to take the preconfigured action on the digital assets on behalf of the person.

In Example 8 the subject matter of Examples 1-4 optionally includes wherein the instructions further comprise instructions that when executed cause the gateway system to configure the preconfigured action to be performed by a member of the plurality of service providers based on a category of the member of the plurality of service providers.

In Example 9 the subject matter of Examples 1-4 optionally includes wherein the instructions further comprise instructions that when executed cause the gateway system to configure the indication of the trigger event.

In Example 10 the subject matter of Examples 1-4 optionally includes wherein the instructions further comprise instructions that when executed cause the gateway system to: register the gateway system with each of the plurality of service providers.

Example 11 is a machine readable medium, on which are stored instructions, comprising instructions that when executed cause a gateway system to: receive an indication of a trigger event corresponding to a person having digital assets managed by a plurality of service providers with which the person is enrolled; authenticate the person; and notify through a trusted authentication interface at least some of the plurality of services providers with which the person is enrolled to take a preconfigured action on the digital assets managed by the at least some of the plurality of services providers, responsive to the trigger event.

In Example 12 the subject matter of Example 11 optionally includes wherein the preconfigured action comprises at least partially blocking access to the digital assets.

In Example 13 the subject matter of Example 11 optionally includes wherein the preconfigured action comprises deleting the digital assets.

In Example 14 the subject matter of Example 11 optionally includes wherein the preconfigured action comprises changing a password corresponding to the person.

In Example 15 the subject matter of Examples 11-14 optionally includes wherein the indication of the trigger event comprises a notification received from the person.

In Example 16 the subject matter of Examples 11-14 optionally includes wherein the instructions further comprise instructions that when executed cause the gateway system to configure the preconfigured action to be performed by a member of the plurality of service providers based on a category of the member of the plurality of service providers.

In Example 17 the subject matter of Examples 11-14 optionally includes wherein the instructions further comprise instructions that when executed cause the gateway system to: register the gateway system with each of the plurality of service providers.

In Example 18 the subject matter of Examples 11-14 optionally includes wherein the instructions further comprise instructions that when executed cause the gateway system to: receive responses from the at least some of the plurality of service providers; and notify the person of the responses.

Example 19 is a machine readable medium, on which are stored instructions, comprising instructions that when executed cause a broker system to: configure the broker system to interact with a service provider that manages digital assets for a person; receive a service provider independent notification from a gateway system to instruct the service provider with to take a preconfigured action on behalf of the person; and send to the service provider through a trusted authentication interface a service provider dependent notification instructing the service provider to take the preconfigured action on the digital assets on behalf of the person, responsive to the service provider independent notification.

In Example 20 the subject matter of Example 19 optionally includes wherein the instructions further comprise instructions that when executed cause the broker system to: receive a response from the service provider; and forward the response from the service provider to the gateway system.

Example 21 is a method of controlling access to digital assets of a person managed by a plurality of service providers, comprising: receiving an indication of a trigger event corresponding to the person; authenticating the person; and instructing through a trusted authentication interface at least some of the plurality of service providers to take an action on the digital assets managed by the at least some of the plurality of service providers, responsive to the trigger event.

In Example 22 the subject matter of Example 21 optionally includes wherein instructing comprises: instructing a plurality of brokers, each configured for a corresponding one of the at least some of the plurality of service providers, to instruct the corresponding one of the at least some of the plurality of service providers to perform the action on the digital assets on behalf of the person.

In Example 23 the subject matter of Example 21 optionally includes wherein the action comprises at least partially blocking access to the digital assets.

In Example 24 the subject matter of Example 21 optionally includes wherein the action comprises changing an authentication token corresponding to the person.

In Example 25 the subject matter of Examples 21-24 optionally includes wherein the trigger event is an automatically detected trigger event.

Example 26 is a gateway system apparatus, comprising: a processor; and memory coupled to the processor, on which are stored instructions comprising instructions that when executed cause the processor to: receive an indication of a trigger event corresponding to a person having digital assets managed by a plurality of service providers with which the person is enrolled; authenticate the person; and notify through a trusted authentication interface at least some of the plurality of services providers with which the person is enrolled to take a preconfigured action on the digital assets managed by the at least some of the plurality of services providers, responsive to the trigger event.

In Example 27 the subject matter of Example 26 optionally includes wherein the preconfigured action comprises at least partially blocking access to the digital assets.

In Example 28 the subject matter of Example 26 optionally includes wherein the preconfigured action comprises deleting the digital assets.

In Example 29 the subject matter of Example 26 optionally includes wherein the preconfigured action comprises changing a password corresponding to the person.

In Example 30 the subject matter of Examples 26-29 optionally includes wherein the indication of the trigger event comprises a notification received from the person.

In Example 31 the subject matter of Examples 26-29 optionally includes wherein the instructions further comprise instructions that when executed cause the processor to configure the preconfigured action to be performed by a member of the plurality of service providers based on a category of the member of the plurality of service providers.

In Example 32 the subject matter of Examples 26-29 optionally includes wherein the instructions further comprise instructions that when executed cause the processor to: register the gateway system with each of the plurality of service providers.

In Example 33 the subject matter of Examples 26-29 optionally includes wherein the instructions further comprise instructions that when executed cause the processor to: receive responses from the at least some of the plurality of service providers; and notify the person of the responses.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A gateway system to manage digital assets owned by a user and hosted by a first online service provider and a second online service provider, the gateway system comprising:
   a trusted authentication interface;
   one or more processors; and
   memory including instructions that, when executed, cause the one or more processors to at least:
      authenticate the user with the first and second online service providers using the trusted authentication interface;
      detect an event corresponding to security of the digital assets; and
      responsive to the event, instruct, via the trusted authentication interface, the first and second online service providers to take an action with respect to one or more of the digital assets, the first and second online service providers to trust the instructions from the trusted authentication interface without further authenticating the user.

2. The gateway system of claim 1, wherein the action includes at least one of: (1) blocking access to the at least one of the digital assets, (2) deleting the at least one of the digital assets, and (3) changing a password corresponding to the user.

3. The gateway system of claim 1, wherein the event includes at least one of a request from the user, compromised safety of the user, compromise of a digital entity of the user, or confiscation of a device with access to the one or more of the digital assets.

4. The gateway system of claim 1, further including a broker corresponding to the first online service provider, the broker including:
   one or more broker processors; and
   a broker memory, the broker memory including instructions which, when executed, cause the one or more broker processors to at least, in response to an instruction from the gateway system, instruct the first online service provider to take the action.

5. The gateway system of claim 1, wherein the one or more processors are to register the trusted authentication interface with the first and second online service providers.

6. The gateway system of claim 1, wherein the one or more processors are to notify the user of a response to the instruction from one or more of the first and second online service providers via a first notification method, the first notification method prioritized over a second notification method based on a configuration set by the user.

7. The gateway system of claim 1, wherein the one or more processors are to synchronize one or more digital assets with the first and second online service providers based on one or more actions taken on the one or more digital assets.

8. The gateway system of claim 1, wherein the one or more processors are to communicate with the first and second online service providers via cryptographically secured communications.

9. A storage device comprising instructions that, when executed, cause one or more processors to at least:
   authenticate a user with first and second online service providers using a trusted authentication interface, the first and second online service providers hosting digital assets of the user;
   detect an event corresponding to security of the digital assets; and
   responsive to the event, instruct, via the trusted authentication interface, the first and second online service providers to take an action with respect to one or more of the digital assets, the first and second online service providers to trust the instructions from the trusted authentication interface without further authenticating the user.

10. The storage device of claim 9, wherein the action includes at least one of: (1) blocking access to the at least one of the digital assets, (2) deleting the at least one of the digital assets, and (3) changing a password corresponding to the user.

11. The storage device of claim 9, wherein the event includes at least one of a request from the user, compromised safety of the user, compromise of a digital entity of the user, or confiscation of a device with access to the one or more of the digital assets.

12. The storage device of claim 9, wherein the instructions, when executed, cause the one or more processors to register the trusted authentication interface with the first and second online service providers.

13. The storage device of claim 9, wherein the instructions, when executed, cause the one or more processors to notify the user of a response to the instruction from one or more of the first and second online service providers.

14. The storage device of claim 13, wherein the instructions, when executed, cause the one or more processors to notify the user of the response via a first notification method, the first notification method prioritized over a second notification method based on a configuration set by the user.

15. The storage device of claim 9, wherein the instructions, when executed, cause the one or more processors to synchronize the one or more the digital assets with the first and second online service providers based on one or more actions taken on the one or more of the digital assets.

16. The storage device of claim 9, wherein the instructions, when executed, cause the one or more processors to communicate with the first and second online service providers via cryptographically secured communications.

17. A method of managing digital assets owned by a user and hosted by a first online service provider and a second online service provider, the method comprising:
   authenticating the user with the first and second online service providers using a trusted authentication interface;
   detecting an event corresponding to security of the digital assets; and
   in response to the event, transmitting a signal, via the trusted authentication interface, to cause the first and second online service providers to take an action with respect to one or more of the digital assets, the first and second online service providers to take the action without further authenticating the user.

18. The method of claim 17, wherein the transmitting of the signal includes instructing a broker corresponding to each of the first and second online service providers to cause respective ones of the first and second online service providers to take the action with respect to respective ones of the digital assets on behalf of the user without further authenticating the user.

19. The method of claim 17, wherein the action includes at least one of: (1) blocking access to at least one of the digital assets, (2) deleting the at least one of the digital assets, and (3) changing an authentication token corresponding to the user.

20. The method of claim 17, wherein the event includes at least one of a request, compromised safety of the user, compromise of a digital entity of the user, or confiscation of a device with access to the one or more of the digital assets.

21. The method of claim 17, further including notifying the user of a response to the signal from one or more of the first and second online service providers via a first notification method, the first notification method prioritized over a second notification method based on a configuration set by the user.

22. The method of claim 17, further including synchronizing the one or more digital assets with the first and second online service providers based on one or more actions taken on the one or more digital assets.

23. The method of claim 17, further including communicating with the first and second online service providers via cryptographically secured communications.

* * * * *